United States Patent
Takemura et al.

(10) Patent No.: US 7,997,424 B2
(45) Date of Patent: Aug. 16, 2011

(54) FLAT MEMBRANE ELEMENT AND MANUFACTURING METHOD THEREOF

(75) Inventors: Kiyokazu Takemura, Chiyoda-ku (JP);
Makoto Oonishi, Chiyoda-ku (JP);
Mitsuru Hatanaka, Matsudo (JP);
Takashi Fujimoto, Matsudo (JP);
Tatsuaki Tagashira, Matsudo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 18 days.

(21) Appl. No.: 12/382,660

(22) Filed: Mar. 20, 2009

(65) Prior Publication Data
US 2009/0184046 A1    Jul. 23, 2009

Related U.S. Application Data

(62) Division of application No. 11/640,317, filed on Dec. 18, 2006.

(30) Foreign Application Priority Data

Jan. 6, 2006 (JP) ................................. 2006-001683

(51) Int. Cl.
*B01D 39/00* (2006.01)
*B01D 29/00* (2006.01)
*B01D 29/01* (2006.01)
*B01D 29/05* (2006.01)
*B01D 63/00* (2006.01)

(52) U.S. Cl. ................... 210/486; 210/321.84; 210/483; 210/490

(58) Field of Classification Search .................. None
See application file for complete search history.

(56) References Cited

U.S. PATENT DOCUMENTS

| 3,339,742 A | 9/1967 | Kracklauer |
| 7,122,121 B1 | 10/2006 | Ji |
| 2006/0219624 A1 | 10/2006 | Kuno |

FOREIGN PATENT DOCUMENTS

| CN | 1676202 A | 10/2005 |
| EP | 1 438 998 A2 | 7/2004 |
| JP | 2000-107576 | * 4/2000 |
| JP | A 2005-279580 | 10/2005 |
| JP | 2005-313153 A | 11/2005 |
| WO | WO 2005/118116 A1 | 12/2005 |

OTHER PUBLICATIONS

Nov. 27, 2009 English Translation of Chinese Office Action issued in the corresponding Chinese application.
May 14, 2010 Office Action issued in U.S. Appl. No. 11/640,317.
Nov. 3, 2009 Office Action issued in U.S. Appl. No. 11/640,317.
May 12, 2009 Office Action issued in U.S. Appl. No. 11/640,317.
Feb. 2, 2011 Office Action issued in U.S. Appl. No. 11/640,317.
Final Rejection issued Sep. 22, 2010 in U.S. Appl. No. 11/640,317.

* cited by examiner

*Primary Examiner* — Benjamin Kurtz
(74) *Attorney, Agent, or Firm* — Oliff & Berridge, PLC

(57) ABSTRACT

Even when a membrane sheet contains an inorganic material, the membrane sheet and a support plate are properly deposited by a laser emission. In a manufacturing method of a flat membrane element lapping a membrane sheet performing solid-liquid separation on a support plate supporting the membrane sheet and emitting a laser to a mutual joint portion to deposit the membrane sheet and the support plate, when the membrane sheet contains an inorganic material, the support plate is formed by a material having laser penetration and the laser is emitted from the support plate side to the joint portion.

14 Claims, 5 Drawing Sheets

FLAT MEMBRANE ELEMENT AND MANUFACTURING METHOD THEREOF

This is a Divisional of application Ser. No. 11/640,317 filed Dec. 18, 2006. The entire disclosure of the prior application is hereby incorporated by reference.

BACKGROUND OF THE INVENTION

1. Field of the Invention

The present invention relates to a flat membrane element and a manufacturing method thereof.

2. Description of the Related Art

A flat membrane element of this kind is set in water to be processed in a dipped manner and used to filtrate the water to be processed. FIG. 5 is a partial sectional view showing a general structure of a flat membrane element. A support plate 1 is formed such that a circumferential edge 2 thereof has a flame shape and a water passing portion 3 is formed in the inner portion thereof. A membrane sheet 4 is formed on both the face of the support plate 1. A suction port 5 is connected with a circumferential edge 2. In addition, the outer surface of the circumferential edge 2 and the membrane sheet 4 has a joint portion 6 formed by lapping each other. By effecting negative pressure in the suction port 5 or by effecting positive pressure from the outer surface of the membrane sheet 4, the water to be processed is filtrated and the filtrated water transmitted through the membrane sheet 4 is discharged from the suction port 5 via the water passing portion 3. Note that the water passing portion 3 of the support plate 1 is specially treated to have a figure through which the filtrated water can pass freely while supporting the surface of the membrane sheet 4 to prevent the membrane sheet 4 attached from sagging.

The membrane sheet 4 is called for example an ultrafiltration membrane or an ultrafilter membrane, and that made of synthetic resin is used in general. Also, the support plate 1 made of synthetic resin, which shows a favorable jointing characteristic with the membrane sheet 4, is used. It is important for the flat membrane element to ensure watertightness of the joint portion 6, so that a method of jointing the support plate 1 and the membrane sheet 4 with an adhesive is widely employed. However, the method of using the adhesive easily causes deviation in adhesive force in addition to the problems that the adhesive easily deteriorates to lower the watertightness and that leak from the lateral direction along the joint surface of the membrane sheet 4 is easily caused.

As a method of improving the problem in the jointing method using the adhesive, a flat-membrane-element manufacturing method in which a membrane sheet is deposited on a support plate by lapping the membrane sheet and the support plate each other and emitting a laser to the mutually jointed portion is disclosed in Japanese Patent Application Laid-Open No. 2005-279580. In this method, the membrane sheet is made of a material having larger laser penetration and the support plate is made of a material having larger laser absorption property, in which the membrane sheet is deposited on the support plate by emitting a laser from the membrane sheet side to the joint portion while pressing the membrane sheet toward the support plate. In the method disclosed in Japanese Patent Application Laid-Open No. 2005-279580, the flat membrane element having strong adhesive force at the joint portion in which the deterioration and the leak from the lateral direction of the membrane sheet are hard to be caused can be manufactured at relatively low costs.

However, some flat membrane elements contain an inorganic material such as ceramics or metal fine particles as a membrane sheet. In the flat membrane elements as described above, even when the laser is emitted from the membrane sheet side, the laser does not penetrate due to the inorganic material interrupting it. Therefore, it is impossible to deposit the joint portion of the membrane sheet and the support plate, indicating a problem that the method disclosed in Japanese Patent Application Laid-Open No. 2005-279580 is not applicable thereto.

SUMMARY OF THE INVENTION

An object of the present invention is to provide a manufacturing method of a flat membrane element capable of depositing a joint portion of a membrane sheet and a support plate by a laser emission even when the membrane sheet contains an inorganic material by bringing a solution to a problem in a conventional art as described before.

In order to attain the above-described object, a manufacturing method of a flat membrane element according to the present invention is a manufacturing method of a flat membrane element, in which a membrane sheet performing solid-liquid separation and a support plate supporting the membrane sheet are lapped each other while the support plate is formed by a material having laser penetration, and the membrane sheet and the support plate are deposited by a laser emission from the support plate side to the joint portion. In the above-described method, the joint portion lapping the membrane sheet onto the support plate is pressed by a pressing member formed by a material having laser penetration and the laser is emitted from an outside of the pressing member to the joint portion. Further, the membrane sheet includes a skin layer, a support layer and a wetting layer therebetween, and the laser is emitted so that the support layer side is directly deposited onto the support plate by jointing the support layer side with the support plate. The joint potion is allowed to include a deposition agent having laser absorption property therein. This is effective when the membrane sheet is made of an inorganic material. Further, when the flat membrane element has a structure in which the membrane sheet is attached onto both surfaces of the support plate, it is preferable that a first membrane sheet is deposited onto one surface of the support plate and, after that, a second membrane sheet to be attached onto the other surface of the support plate is arranged such that the joint portion thereof with the support plate comes outside the edge portion of the first membrane sheet to be deposited.

According to the present invention, the support plate is formed by the material having laser penetration and the laser is emitted from the support plate side to the joint potion, so that the joint portion of the membrane sheet and the support plate can be deposited easily by the laser emission even when the membrane sheet contains the inorganic material and without laser penetration.

Further, when the deposition agent having laser absorption property is intervened in the joint portion, it is possible to choose an optimal deposition agent having higher laser absorption property separately from the material composing the membrane sheet, so that the manufacturing of the flat membrane element with high reliability can be realized. Therefore, the present invention is applicable even when the membrane sheet is formed by the inorganic material only.

Further, when the second membrane sheet to be attached onto the other surface of the support plate is arranged so that the joint potion thereof with the support portion comes outside the edge portion of the first membrane sheet to be deposited on the other surface, after the first membrane sheet is deposited onto the one surface of the support plate, the present invention can be properly embodied even when the flat membrane element has the structure in which the membrane sheet is attached onto both the surfaces of the support plate, respectively.

Furthermore, according to the present invention, a flat membrane element including: a support plate formed by a material having laser penetration; a first membrane sheet of which circumference is attached to the one surface of the support plate; and a second membrane sheet to be arranged on the other surface of the support plate, which is formed to have a larger size as compared with the first sheet and deposited on the outer peripheral side of the deposition line of the first membrane sheet, is provided.

DETAILED DESCRIPTION OF THE PREFERRED EMBODIMENTS

Figure 1:
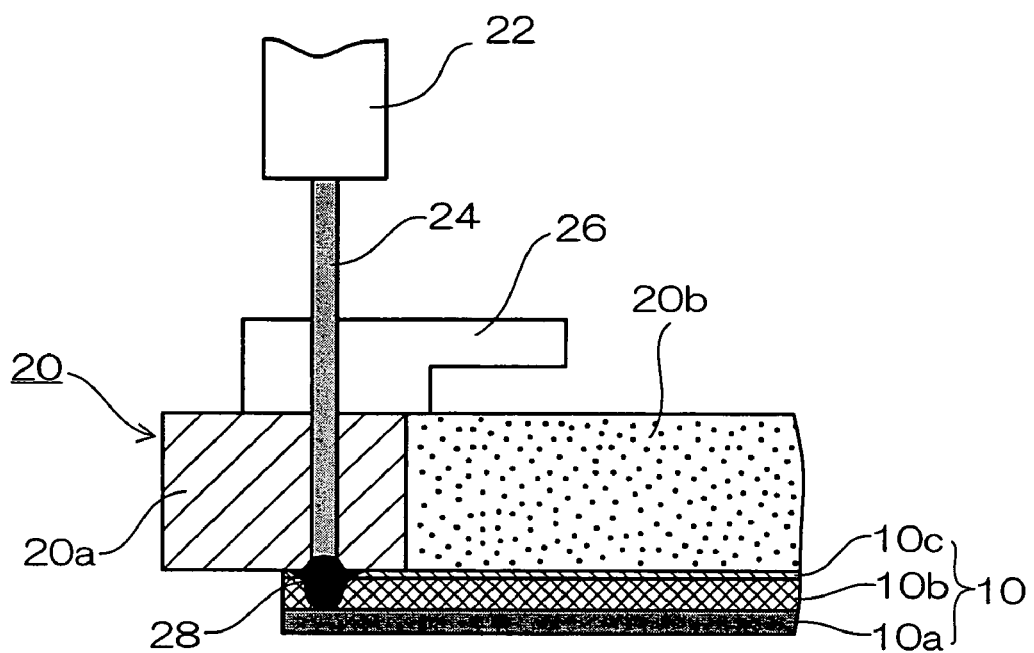
FIG. 1 is a partial sectional view showing a first embodiment of a manufacturing method of a flat membrane element according to the present invention.

FIG. 1 is a partial sectional view showing a first embodiment of a manufacturing method of a flat membrane element according to the present invention. A membrane sheet 10 is roughly composed of a skin layer 10a, a wetting layer 10b and a support layer 10c. The skin layer 10a bears a solid-liquid separating part and is formed by an inorganic material such as ceramics or metal fine particles. The support layer 10c bears a part of supporting the entire membrane sheet 10 and is formed by, for example, a synthetic resin such as polyethylene. It is also effective to mix a pigment such as carbon black into the synthetic resin by which laser absorption property increases. The wetting layer 10b is formed in the wetted state in a manner that the material composing the skin layer 10a is entered into, the support layer 10c. These respective layers actually do not have clear border lines as shown in the drawing, and the wetting layer 10b has the inorganic material composing the skin layer 10a at high ratio on the skin layer 10a side and the ratio reduces as it comes closer to the support layer 10c side.

A support plate 20 is composed of a circumferential edge 20a of a frame shape and a water passing portion 20b in the frame portion. The water passing portion 20b is specially treated to have a figure through which the filtrated water can pass freely while supporting the surface of the film sheet 10 to prevent the film sheet 10 attached from sagging. The support plate 20 is formed by a material having laser penetration, preferably, by a synthetic resin with high transparency. The synthetic resin mixed with the pigment has lower transparency in which the laser penetration lowers, being not desirable as a material for the support plate 20.

When manufacturing the flat membrane element by depositing the membrane sheet 10 and the support plate 20, the under surface of the support plate 20 is lapped onto the upper surface of the membrane sheet 10 having the support layer 10c on its upper side, as shown in FIG. 1. Subsequently, the joint portion at which the membrane sheet 10 and the support plate 20 are lapped is pressed from the upper surface of the circumferential edge 20a of the support plate 20 by a pressing member 26 to increase adhesiveness of the membrane sheet 10 and the support plate 20 at the joint portion. Subsequently, a laser 24 is emitted from the upper surface side of the support plate 20 to the joint portion by a laser designator 22.

The laser 24 reached to the circumferential edge 20a penetrates the circumferential edge 20a having the laser penetration to reach the upper surface of the support layer 10c of the membrane sheet 10. Since the support layer 10c is formed by the synthetic resin having high laser penetration as described before, the laser 24 reached to the support layer 10c is absorbed by the support layer 10c to fuse the resin of the support layer 10c by heat of mixing at this time. The heat of mixing is conveyed further to the wetting layer 10b of the membrane sheet 10 to fuse the resin of the wetting layer 10b as well, so that fusion zone can be enlarged further to the skin layer 10a. Further, the fusion heat of the resin of the support layer 10c is conveyed to the under surface of the circumferential edge 20a of the support plate 20 to fuse the resin composing the circumferential edge 20a.

By performing the fusing operation of the synthetic resin based on the emission of the laser 24 as descried above along the path of deposition, the fusion zone cured by natural cooling after the laser emission forms a weld 28. The weld 28 deposits the membrane sheet 10 and the support plate 20 tightly and, at the same time, the deposition zone reaches further to the skin layer 10a, so that the transverse section of the wetting layer 10b of the membrane sheet 10 is shielded. Accordingly, the leak in the lateral direction arising from the wetting layer 10b or the support layer 10c in the membrane sheet 10 is effectively prevented.

Note that the pressing member 26 is preferably formed by a material having high laser penetration as in the support plate 20. Specifically, the pressing member 26 is frequently arranged at a position interfering with the laser emission of the laser 24, however, the pressing member 26 formed by the material having high laser penetration allows the emission of the laser 24 to be performed via the pressing member 26, so that the workability in the fusing operation performed along the path of deposition is dramatically improved.

Figure 2:
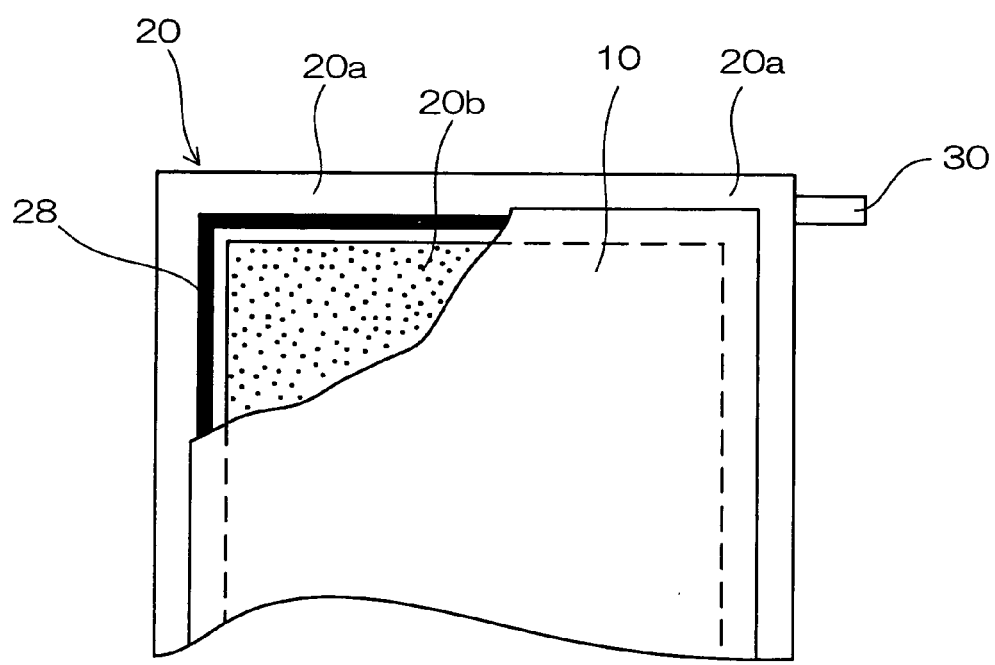
FIG. 2 is a partial front view showing a part of a commercialized flat membrane element by cutting a part thereof.

FIG. 2 is a partial front view showing a part of a commercialized flat membrane element by cutting a part thereof. The membrane sheet 10 is deposited onto the support plate 20 by the weld 28 formed at all the circumferential edge 20a. The circumferential edge 20a is provided with a suction port 30 to suck the filtrated water, and the water permeated through the membrane sheet 10 goes through the water passing portion 20b and is discharged outside from the suction port 30. FIG. 2 shows the case where the membrane sheet 10 and the support plate 20 are deposited by the single band of weld 28, however, when two bands of weld portions are used to deposit the membrane sheet 10 and the support plate 20, a flat membrane element with further rigidity can be manufactured, as described in Japanese Patent Application Laid-Open No. 2005-279580.

Figure 3:
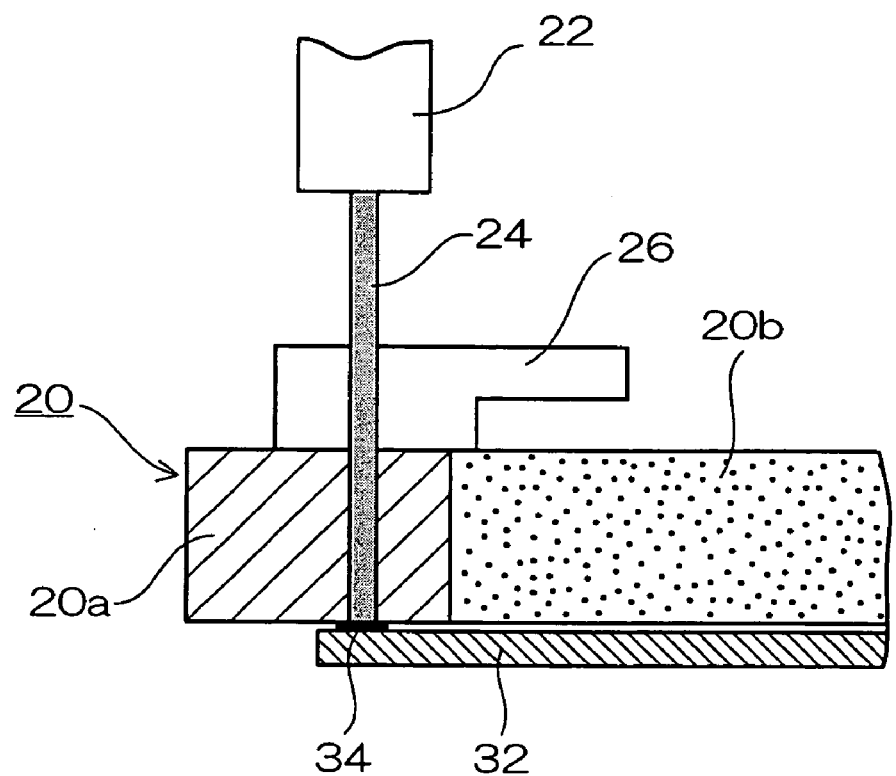
FIG. 3 is a partial sectional view showing a second embodiment of the manufacturing method of the flat membrane element according to the present invention.

FIG. 3 is a partial sectional view showing a second embodiment of the manufacturing method of the flat membrane element according to the present invention. In FIG. 3, the elements denoted by the same numerical references as in FIG. 1 are the same elements as in the first embodiment and therefore their detailed descriptions will be omitted here. In the present embodiment, a deposition agent 34 having laser absorption property intervenes into the joint portion of a membrane sheet 32 and the support plate 20. The deposition agent 34 can exist in an intervening manner as shown in the drawing by applying the deposition agent 34 onto the joint portion of the upper surface of the membrane sheet 32 or the joint portion of the under surface of the support plate 20 in advance and by lapping them. Further, when the deposition agent 34 is formed not by a material of an applicable type but a type capable of keeping its shape, the deposition agent 34 is formed in accordance with the path of deposition and placed on the upper surface of the joint portion of the membrane sheet 32 and, after that, the support plate 20 is lapped thereon, so that the deposition agent 34 can intervene to be put in the state as shown in the drawing. In the present embodiment, with the emission of the laser 24, the deposition agent 34 absorbs the laser to fuse at first, and the fusion heat is conveyed to the membrane sheet 32 and the circumferential edge 20a of the support plate 20 to promote the deposition. According to the method of the present embodiment, it is possible to select the optimal deposition agent 34 having high laser absorption property separately from the material composition of the membrane sheet 32, so that the manufacturing of the flat membrane element with high reliability can be realized. Accordingly, the present method is also applicable to the case where the membrane sheet 32 is composed of the inorganic material only. However, the inorganic material generally has a high fusing point being difficult to fuse by the laser emission. Therefore, when the membrane sheet 32 is composed of the inorganic material only, it is important to select and/or determine the deposition agent 34 and/or the laser emission conditions so that the fused substance of the deposition agent 34 enters deeply into between the particles of the inorganic material to form the layer like the wetting layer 10b described in the first embodiment.

Figure 4:
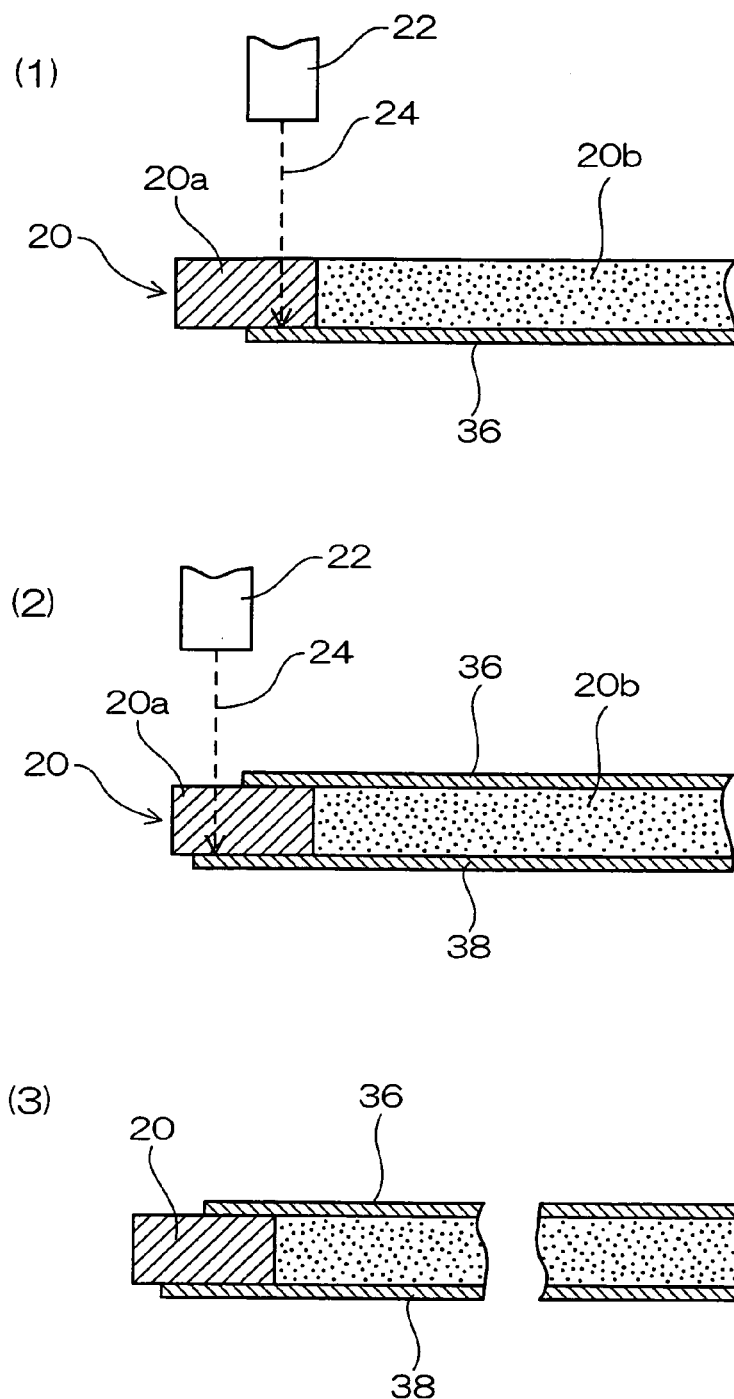
FIGS. 4(1) to 4(3) are partial sectional views showing a third embodiment of the manufacturing method of the flat membrane element according to the present invention.
Figure 5:
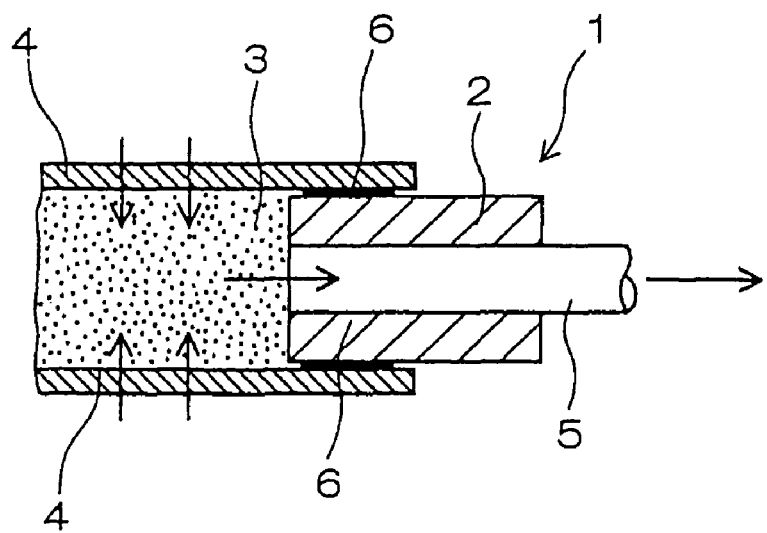
FIG. 5 is a partial sectional view showing a general structure of a flat membrane element.

FIGS. 4(1) to 4(3) are partial sectional views showing a third embodiment of the manufacturing method of the flat membrane element according to the present invention. In FIGS. 4(1) to 4(3), the elements denoted by the same numerical references as in FIG. 1 are the same elements as in the first embodiment and therefore their detailed descriptions will be omitted here. Generally, the flat membrane element adopts the structure in which the membrane sheet is attached onto both the surfaces of the support plate, respectively, as shown in FIG. 5. When manufacturing the flat membrane element of the structure as described above, the method shown in FIGS. 4(1) to 4(3) is adopted.

Specifically, in the first step, a first membrane sheet 36 is deposited onto one surface of the support plate 20 by emitting the laser 24 as shown in FIG. 4 (1). In the second step, as a second membrane sheet 38 to be attached onto the other surface of the support plate 20, that having sufficiently larger plane area than that of the first membrane sheet 36 is prepared in advance. Next, as shown in FIG. 4 (2), the support plate 20 having the first membrane sheet 36 deposited in the first step is reversed to be arranged such that the joint portion of the second membrane sheet 38 and the support plate 20 comes outside the edge of the first membrane sheet 36 and the second membrane sheet 38 is deposited by emitting the laser 24. As a result, as shown in FIG. 4 (3), a flat membrane element 40, in which the first membrane sheet 36 is attached onto the one surface of the support plate 20 and the second membrane sheet 38 having sufficiently larger plane area than that of the first membrane sheet 36 is attached onto the other surface of the support plate 20, is manufactured.

According to the present embodiment, after the first membrane sheet 36 is deposited onto the one surface of the support plate 20, the second membrane sheet 38 to be attached onto the other surface of the support plate 20 is arranged so that the joint potion thereof with the support plate 20 comes outside the edge portion of the first membrane sheet 36 to be deposited, so that the method of emitting the laser 24 from the support plate 20 side can be properly performed even when the flat membrane element 40 is structured to have the first and second membrane sheets 36, 38 attached on both the surface of the laser designator 22, respectively.

As has been described, in the present invention, the support plate composing the flat membrane element is formed by the transparent material having laser penetration, and the laser is emitted in a penetrating manner from the support plate side to the membrane sheet to be deposited to the support plate while at least the portion of the membrane sheet to be deposited is pressed by the pressing member from the support plate side, so that the membrane sheet is deposited thereto. When the support layer to be the joint portion of the deposition and formed by the resin of the membrane sheet is made to have the laser absorption property by being impregnated the pigment such as carbon black, the joint by deposition is further ensured. When the joint is performed to set the deposition agent, which is made to have the laser absorption property by being impregnated the pigment such as carbon black, into the joint portion in an intervening manner and the laser is emitted to the deposition agent such that the laser penetrates the support plate, the membrane sheet can be jointed surely. Ideally, such portions of the support plate and the pressing member that the laser penetrates are made transparent, and the support layer and/or the deposition layer of the membrane element to be jointed side is made black.

What is claimed is:
1. A flat membrane element comprising:
   a support plate formed by a material having laser penetration;
   a first membrane sheet of which circumferential portion is deposited onto a first surface of the support plate; and
   a second membrane sheet formed to have a larger size than the first membrane sheet and arranged on a second surface of the support plate so that the second membrane sheet is deposited at an outer peripheral side of a deposition line of the first membrane sheet,
   wherein the first and second membrane sheets comprise a pigment.
2. The flat membrane element of claim 1, wherein the first and second membrane sheets comprise a synthetic resin.
3. The flat membrane element of claim 1, wherein the first and second membrane sheets are attached onto the support plate by a weld.
4. The flat membrane element of claim 1, wherein the first and second membrane sheets are laser absorbent.
5. The flat membrane element of claim 1, wherein the first membrane sheet and the second membrane sheet each comprises a skin layer, a support layer and a wetting layer between the skin layer and the support layer.
6. The flat membrane element of claim 5, wherein the skin layer comprises an inorganic material.
7. The flat membrane element of claim 5, wherein the support layer comprises a synthetic resin.
8. The flat membrane element of claim 1, wherein the support plate comprises a water passing portion and a circumferential edge that defines a frame around a lateral edge of the water passing portion, the circumferential edge comprising a laser penetrable material.
9. The flat membrane element of claim 1, wherein the pigment is carbon black.
10. A flat membrane element comprising:
    a support plate formed by a material having laser penetration;

a first membrane sheet of which circumferential portion is deposited onto a first surface of the support plate;

a second membrane sheet formed to have a larger size than the first membrane sheet and arranged on a second surface of the support plate so that the second membrane sheet is deposited at an outer peripheral side of a deposition line of the first membrane sheet; and a deposition agent being at joint portions between each of the first and second membrane sheets and the support plate.

11. The flat membrane element of claim 10, wherein the first and second membrane sheets comprise an absorbent.

12. The flat membrane element of claim 10, wherein the first and second membrane sheets are of inorganic material.

13. The flat membrane element of claim 10, wherein the deposition agent is carbon black.

14. The flat membrane element of claim 10, wherein the support plate comprises a water passing portion and a circumferential edge that defines a frame around a lateral edge of the water passing portion, the circumferential edge comprising a laser penetrable material.

* * * * *